United States Patent
Wray

(10) Patent No.: US 8,525,432 B2
(45) Date of Patent: Sep. 3, 2013

(54) SYSTEM AND METHOD FOR CONTROLLING AN OUTPUT ILLUMINATION LEVEL OF A LIGHTING SYSTEM

(75) Inventor: Donald L. Wray, Ocala, FL (US)

(73) Assignee: USAI, LLC., New Windsor, NY (US)

( * ) Notice: Subject to any disclaimer, the term of this patent is extended or adjusted under 35 U.S.C. 154(b) by 266 days.

(21) Appl. No.: 12/757,333

(22) Filed: Apr. 9, 2010

(65) Prior Publication Data

US 2011/0001435 A1  Jan. 6, 2011

Related U.S. Application Data

(60) Provisional application No. 61/168,073, filed on Apr. 9, 2009.

(51) Int. Cl.
*H05B 37/02* (2006.01)

(52) U.S. Cl.
USPC ........................................................ 315/291

(58) Field of Classification Search
USPC ................. 315/291, 293–295, 307, 311–312, 315/34; 340/5.61, 538.15, 870.01, 870.02
See application file for complete search history.

(56) References Cited

U.S. PATENT DOCUMENTS

| | | | | |
|---|---|---|---|---|
| 6,870,329 | B2 * | 3/2005 | Krieger et al. | 315/295 |
| 6,963,175 | B2 * | 11/2005 | Archenhold et al. | 315/291 |
| 7,236,507 | B2 * | 6/2007 | Stewart et al. | 372/34 |
| 7,573,209 | B2 * | 8/2009 | Ashdown et al. | 315/307 |
| 7,628,512 | B2 | 12/2009 | Netzel, Sr. et al. | |
| 7,817,063 | B2 * | 10/2010 | Hawkins et al. | 340/870.07 |
| 8,098,028 | B2 * | 1/2012 | Trattler | 315/307 |
| 2006/0049782 | A1 * | 3/2006 | Vornsand et al. | 315/312 |
| 2008/0297055 | A1 * | 12/2008 | Miyake et al. | 315/169.2 |
| 2009/0294671 | A1 * | 12/2009 | Baghai | 250/338.1 |

OTHER PUBLICATIONS

E*Star Lighting, Inc.; Nova Strip Lighting Series; Date: Jan. 1, 2000; 3 pages.
E*Star Lighting, Inc; Star Drive 3000 DMX Controller; http://www.estarlighting.com; Date: Jan. 1, 2000; 2 pages.

* cited by examiner

*Primary Examiner* — Minh D A
(74) *Attorney, Agent, or Firm* — St. Onge Steward Johnston & Reens LLC

(57) ABSTRACT

A method of controlling a brightness level of an LED by supplying power to an LED in series with a field effect transistor and a resistor. A first voltage is supplied from a digital potentiometer to an operational amplifier. The field effect transistor is activated based on the first voltage from the operational amplifier and a second voltage is varied across the resistor when the field effect transistor is activated. The varying of the second voltage across the resistor causes a change in the brightness level of the LED.

41 Claims, 8 Drawing Sheets

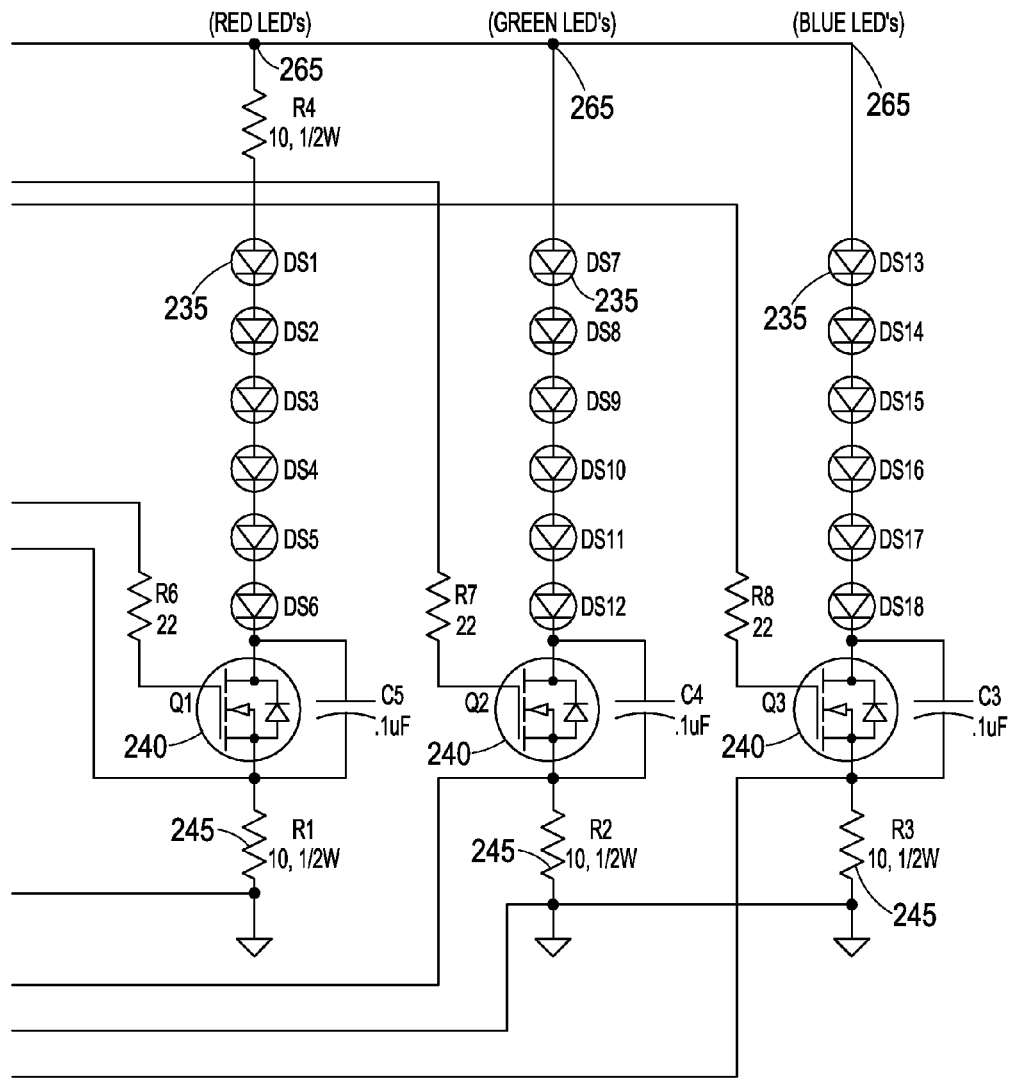
Figure. 2E
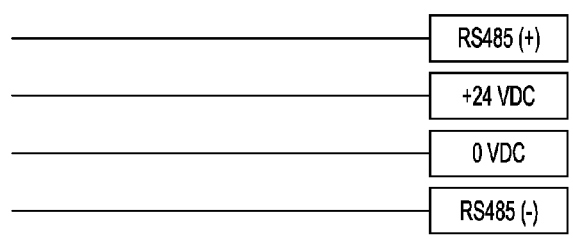

SYSTEM AND METHOD FOR CONTROLLING AN OUTPUT ILLUMINATION LEVEL OF A LIGHTING SYSTEM

CROSS-REFERENCE TO RELATED APPLICATIONS

The present application claims the benefit under 35 U.S.C. §119(e) of the U.S. Provisional Patent Application Ser. No. 61/168,073, filed on Apr. 9, 2009, the content of which is incorporated herein by reference.

FIELD OF THE INVENTION

The present invention relates generally to the control of Light Emitting Diode (LED) arrays, and more specifically, relates to methods and systems for controlling the brightness of LED arrays.

BACKGROUND OF THE INVENTION

In a typical Digital Multiplex Interface (DMX) based LED lighting system, Pulse Width Modulation (PWM) is used to drive the LED's. In a standard PWM system, an intermediate amount of electrical power can be provided by cycling the electrical current between a fully on and a fully off state. The cycling of the current can occur from just a couple of times per minute to well over a thousand times per minute. In all cases, the switching occurs at a high enough rate so as to not interrupt the power supply requirements of the device being powered, in an attempt to limit the visible flickering of the LED's emitted light.

To control the brightness of the LED in a typical DMX based LED lighting system, the duty cycle is adjusted to control the LED on to off time; the duty cycle being defined as the proportion of power on time to the interval of the PWM.

The use of PWM in a DMX based lighting system, while providing a moderately efficient method to control the brightness of an LED, can significantly shorten the lifespan of an LED as the LED is constantly being cycled on and off, typically at a full rated LED current. Each cycling of the power increases the strain of the LED device, shortening the useable lifespan. Furthermore, the constant cycling of power provided to an LED increases the flicker associated with DMX systems, thereby decreasing the aesthetic appeal of an LED lighting system, especially during the video taping or TV broadcasting of the LED.

What is desired, therefore, is a system and method of controlling the brightness of a DMX based LED system that increases the lifespan of the LED's, and decreases the flickering of the LED's

SUMMARY OF THE INVENTION

Accordingly it is an object of the present invention to provide a system and a method for controlling the brightness of an LED using a digital DMX, RDM or other standard or custom control protocol.

These and other objects of the present invention are achieved, in accordance with one embodiment of the present invention, by provision of a system for controlling the brightness level of an LED comprising: a Light Emitting Diode (LED) connected in series with a field effect transistor and a resistor; a digital potentiometer supplying a variable output voltage to an operational amplifier; the operational amplifier connected to the field effect or bipolar transistor to activate the field effect transistor; a power supply connected to the LED; wherein the activation of the field effect transistor by the operational amplifier varies a voltage across the resistor adjusting the brightness level of the LED.

For this application the following terms and definitions shall apply:

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The terms "first" and "second" are used to distinguish one element, set, data, object or thing from another, and are not used to designate relative position or arrangement in time.

The term "network" as used herein includes both networks and internetworks of all kinds, including the Internet, and is not limited to any particular network or inter-network.

In some embodiments, the variable output voltage of the digital potentiometer can be varied by up to 256 steps. In some embodiments, a microcontroller varies the output steps of the digital potentiometer. In certain of these embodiments, the microcontroller is connected to a transceiver. In certain of these embodiments, the microcontroller includes an EEPROM that can be programmed by the transceiver. In some of these embodiments, the transceiver is connected to a network to allow remote control of the transceiver. In some of these embodiments, a remote user can update the program or the firmware installed in the microcontroller. In certain of these embodiments, a DMX control protocol is used to control the brightness of the LED. In certain of these embodiments, the brightness of an array of LED's is controlled. In some of these embodiments, additional resistors, field effect transistors, operational amplifiers, and digital potentiometers are used to control additional LED's.

In accordance with another embodiment of the present invention, a method of controlling a brightness level of an LED comprising the steps of: supplying current to an LED in series with a field effect transistor and a resistor; supplying a first voltage from a digital potentiometer to an operational amplifier; activating the field effect transistor based on the first voltage from the operational amplifier; varying a second voltage across the resistor when the field effect transistor is activated; wherein the varying of the second voltage across the resistor changes the brightness level of the LED.

In some embodiments, the first voltage from the digital potentiometer can vary by up to 256 steps. In some embodiments, a microcontroller varies the voltage steps from the digital potentiometer. In some embodiments, the microcontroller is connected to a transceiver. In certain of these embodiments, the transceiver is connected to a network to allow remote control of the transceiver. In certain of these embodiments, a remote user can update the program and the firmware installed on the microcontroller. In certain of these embodiments, feedback from the field effect transistor is connected to an input on the operational amplifier to stabilize the output of the operational amplifier. In some embodiments, the brightness of a further LED is controlled. In some embodiments, additional field effect transistors, resistors, operational amplifiers, and digital potentiometers are used to control the brightness of the further LED's. In certain of these embodiments, a DMC control protocol is used to control the brightness of the LED.

In accordance with another embodiment of the present invention, a method of controlling a brightness level of an LED comprising the steps of: supplying current to an LED in series with a field effect transistor and a resistor; supplying a first voltage from a digital potentiometer to an operational amplifier; activating the field effect transistor based on the first voltage from the operational amplifier; varying a second voltage across the resistor when the field effect transistor is activated; wherein the varying of the second voltage across the resistor changes the brightness level of the LED. Outputting a third voltage from a second operational amplifier to an input of the digital potentiometer to swamp the error of the digital potentiometer.

In some embodiments, the first voltage from the digital potentiometer can vary by up to 256 steps. In some embodiments, a microcontroller varies the voltage steps from the digital potentiometer. In some embodiments, the microcontroller is connected to a transceiver. In certain of these embodiments, the transceiver is connected to a network to allow remote control of the transceiver. In certain of these embodiments, a remote user can update the program and the firmware installed on the microcontroller. In certain of these embodiments, feedback from the field effect transistor is connected to an input on the operational amplifier to stabilize the output of the operational amplifier. In some embodiments, the brightness of a further LED is controlled. In some embodiments, additional field effect transistors, resistors, operational amplifiers, and digital potentiometers are used to control the brightness of the further LED's. In certain of these embodiments, a DMC control protocol is used to control the brightness of the LED.

In accordance with another embodiment of the present invention, by provision of a system for controlling an output illumination level of a lighting system comprising: a power source; an illumination device coupled to said power source; a voltage converter (including, for example, a voltage-to-current converter) coupled to said illumination device; a load coupled to said voltage to current converter; a controller coupled to said load and said switching device; said controller providing a variable voltage to said load such that a total current passing through said illumination device varies; and wherein the output illumination level of said illumination device varies according to the variable current passing through said illumination device.

In some embodiments, the illumination device is an LED. In some embodiments, the voltage to current converter is a Bipolar Transistor, Junction Field Effect Transistor ("JFET"), Metal-Oxide Semiconductor Field Effect Transistor ("MOSFET"), Depleted Field Effect Transistor ("DEPFET"), Dual Gates Metal-Oxide Semiconductor Field Effect Transistor ("DGMOSFET"), Deoxyribonucleic Acid Field Effect Transistor ("DNAFET"), Fast Recovery Epitaxial Diode Field Effect Transistor ("FREDFET"), High Electron Mobility Transistor ("HEMT"), Insulated Gate Bipolar Transistor ("IGBT"), Ion-Sensitive Field Effect Transistor ("ISFET"), Metal Semiconductor Field Effect Transistor ("MESFET"), Modulation-Doped Field Effect Transistor ("MODFET"), Nanoparticle Organic Memory Field Effect Transistor ("NOMFET"), or a Organic Field Effect Transistor ("OFET"). In some embodiments, the load is a resistor. In certain of these embodiments, the controller is a microcontroller. In some of these embodiments, a digital potentiometer is coupled to the microcontroller.

BRIEF DESCRIPTION OF THE DRAWINGS

FIGS. 2A-2E is a schematic diagram of a system for controlling the brightness of an array of LED's according to FIG. 1.

DETAILED DESCRIPTION OF THE INVENTION

Figure 1:
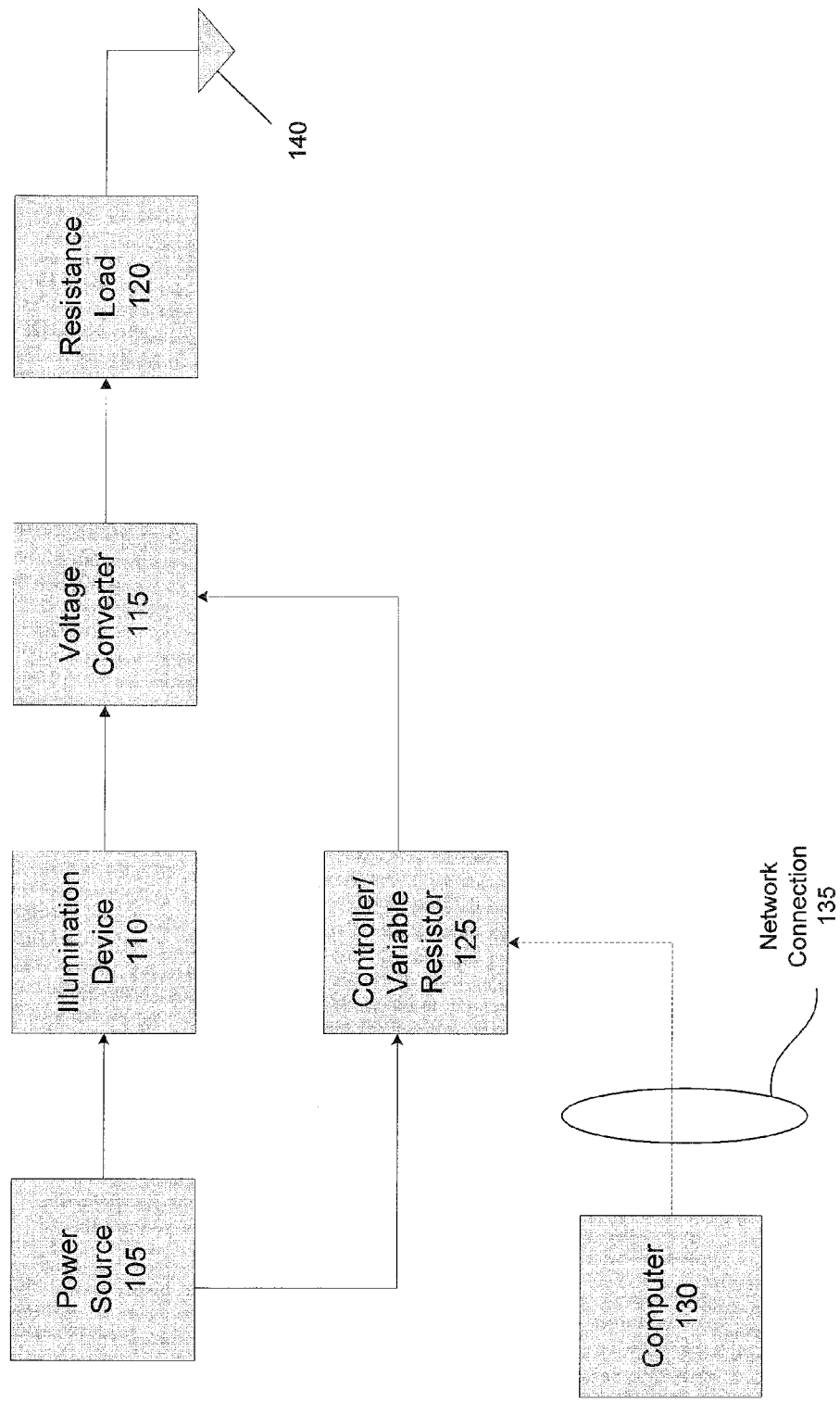
FIG. 1 is a block diagram for a system for controlling the brightness of an illumination device according to the present invention.

The exemplary embodiments of the present invention may be further understood with reference to the following description and the related appended drawings, wherein like elements are provided with the same reference numerals. The exemplary embodiments of the present invention are related to systems and methods for controlling the brightness of an LED or an array of LED's. Specifically, the system and method may allow a user to program or preprogram a system to control the brightness of an LED or an array of LED's. The exemplary embodiments are described with reference to the control of a single LED, however, an array of LED's, including additional components to control the array, may be implemented using the described system and method.

Referring first to FIG. 1, a system for controlling the brightness of an illumination device, in accordance with an embodiment of the present invention, is shown. Power source 105 is couple to illumination device 110, for example an LED or any other type of light emitting device, and to controller 125, for example a microcontroller or any other processing device, to provide a constant power source to illumination device 110 and controller 125. Illumination device 110 is coupled to voltage converter (e.g., a voltage-to-current converter) 115, for example a field effect transistor, such that if voltage converter 115 is not active, a circuit from power source 105 to ground 140 is not completed. When voltage converter 115 is activated, completing a circuit from power source 105 to ground 140, illumination device 110 is activated to a predetermined brightness level depending on the variable voltage outputted by voltage converter 115. Voltage converter 115 is coupled to resistance load 120, for example a resistor or a variable resistor. Resistance load 120 being located after voltage converter 115 in the circuit from power source 105 to ground 140, allows a change in the voltage across the circuit to cause a change in the current across the circuit.

Controller/variable resistor 125, for example a microcontroller coupled to a digital potentiometer or any variable resistance device, is coupled to power source 105 and to voltage converter 115. Controller/variable resistor 125 and voltage converter 115 provide a variable voltage to resistance load 120 to vary the voltage across resistance load 120. When the voltage across resistance load 120 is varied, the current is varied from power source 105 to ground 140, causing a change in the brightness level of the illumination device 110. Controller/variable resistor 125 is further coupled to computer 130 through network connection 135. The term "network" as used herein includes both networks and internetworks of all kinds, including the Internet, and is not limited to any particular network or inter-network. Computer 130 allows for the remote control of controller/variable resistor 125 from a remote location.

Figure 1A:
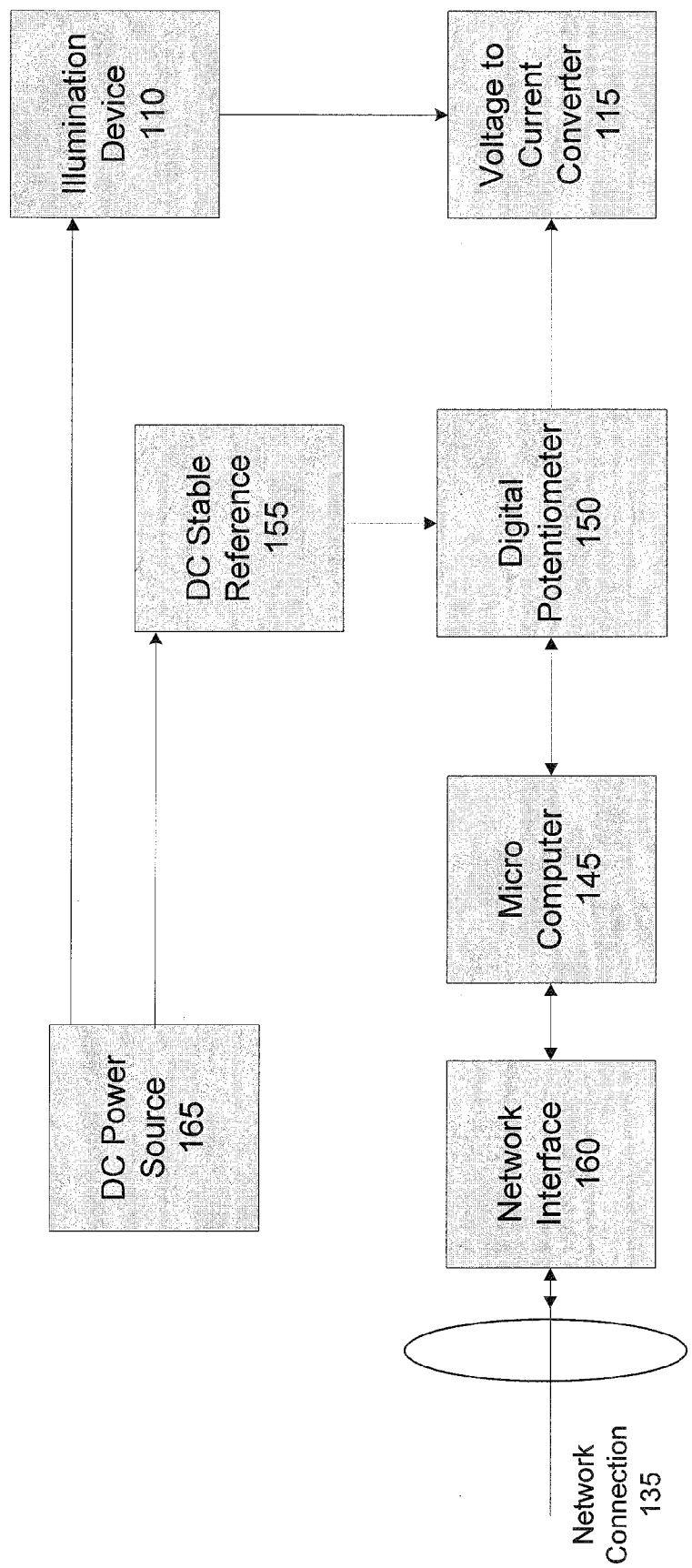
FIG. 1A is a block diagram according to FIG. 1.
Figure 2A:
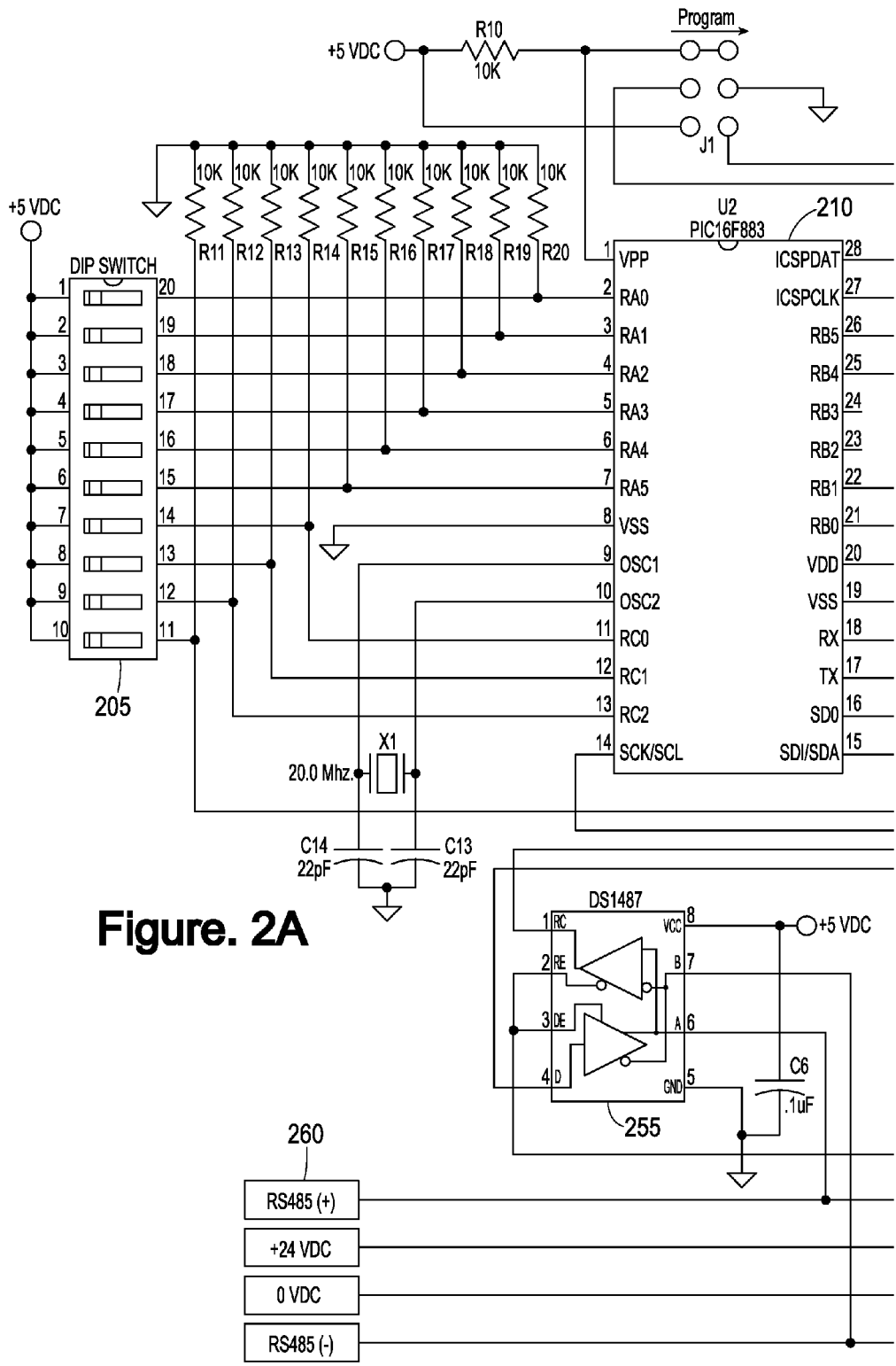
Figure 2B:
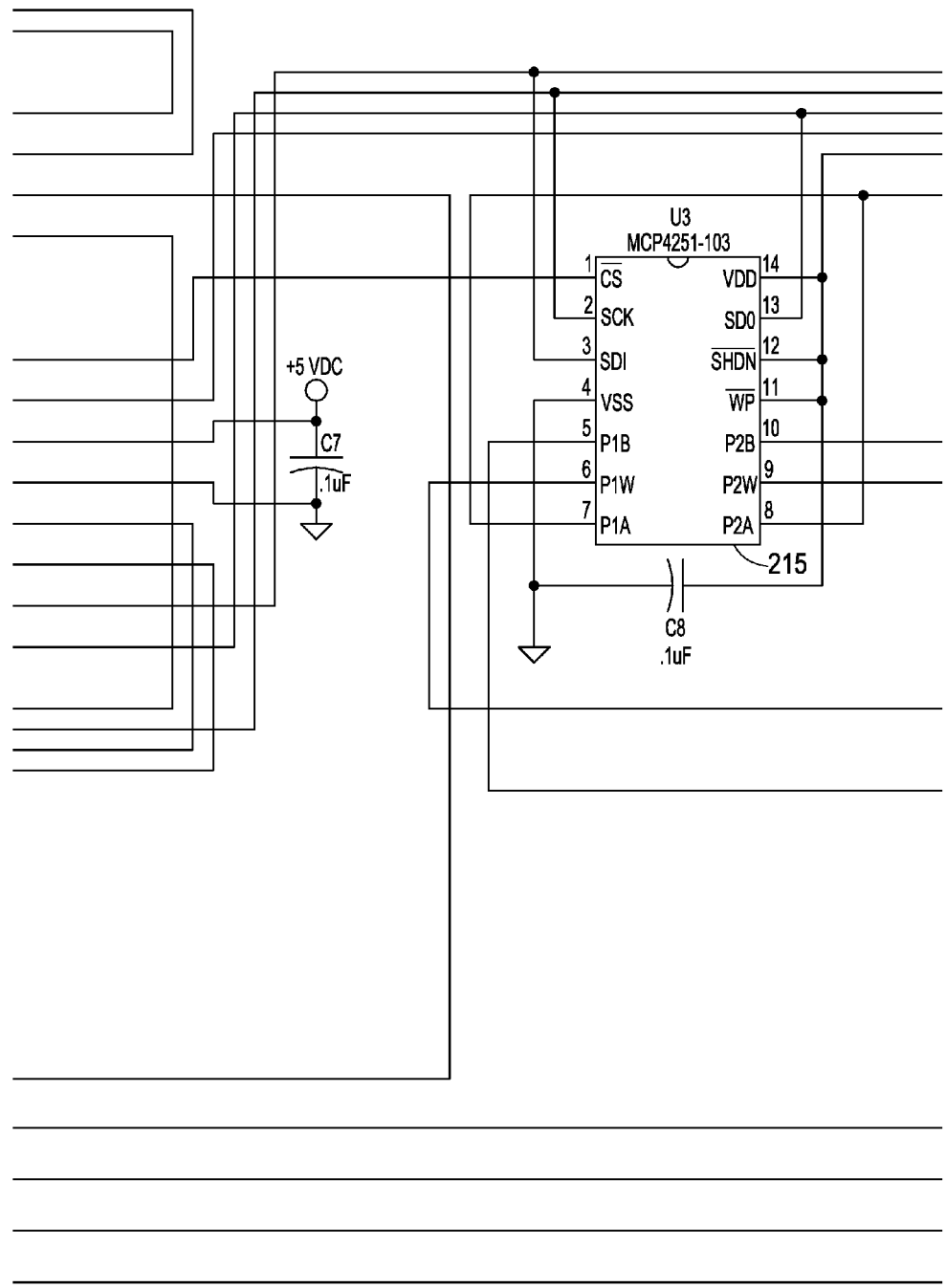
Figure 2C:
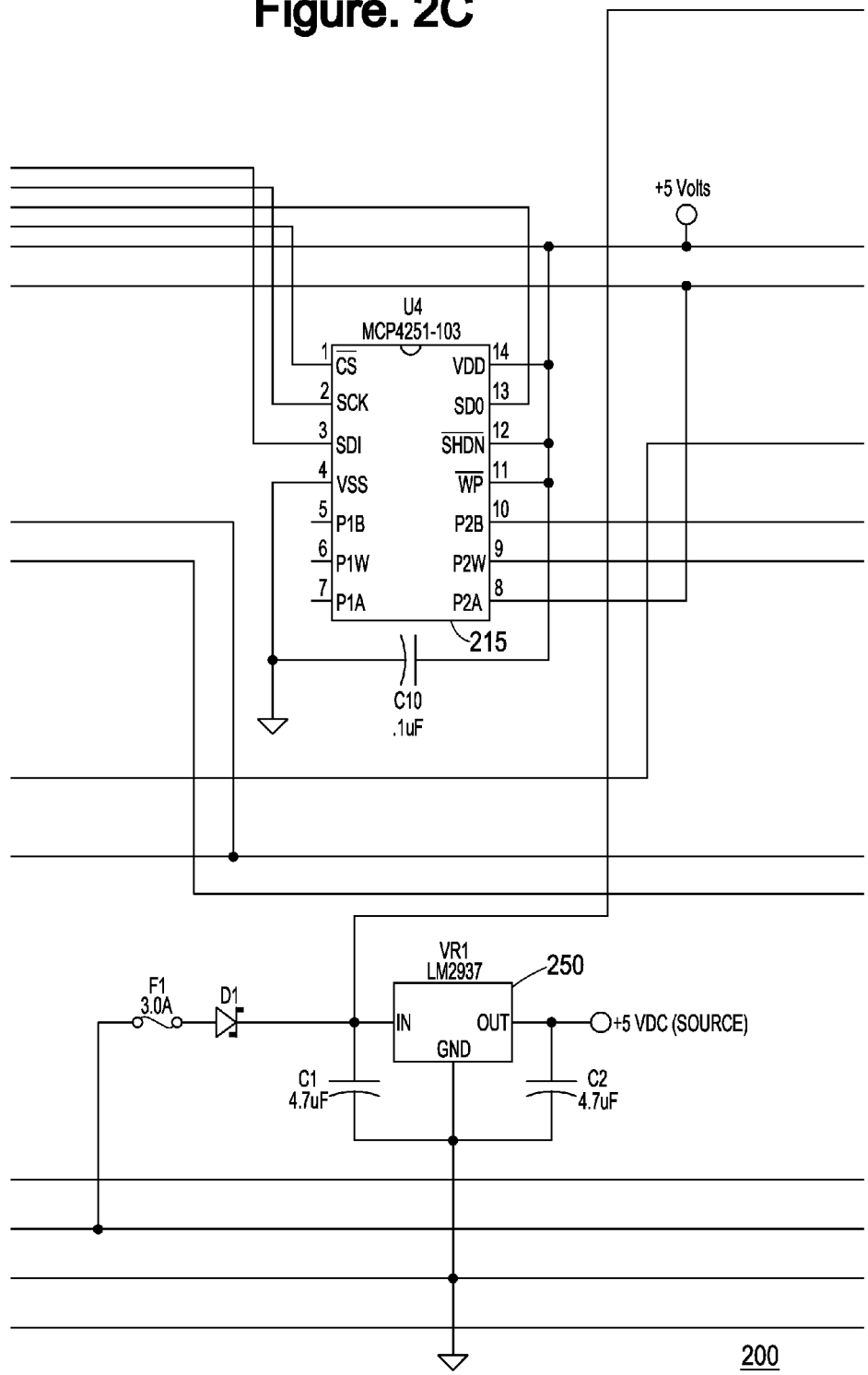
Figure 2D:
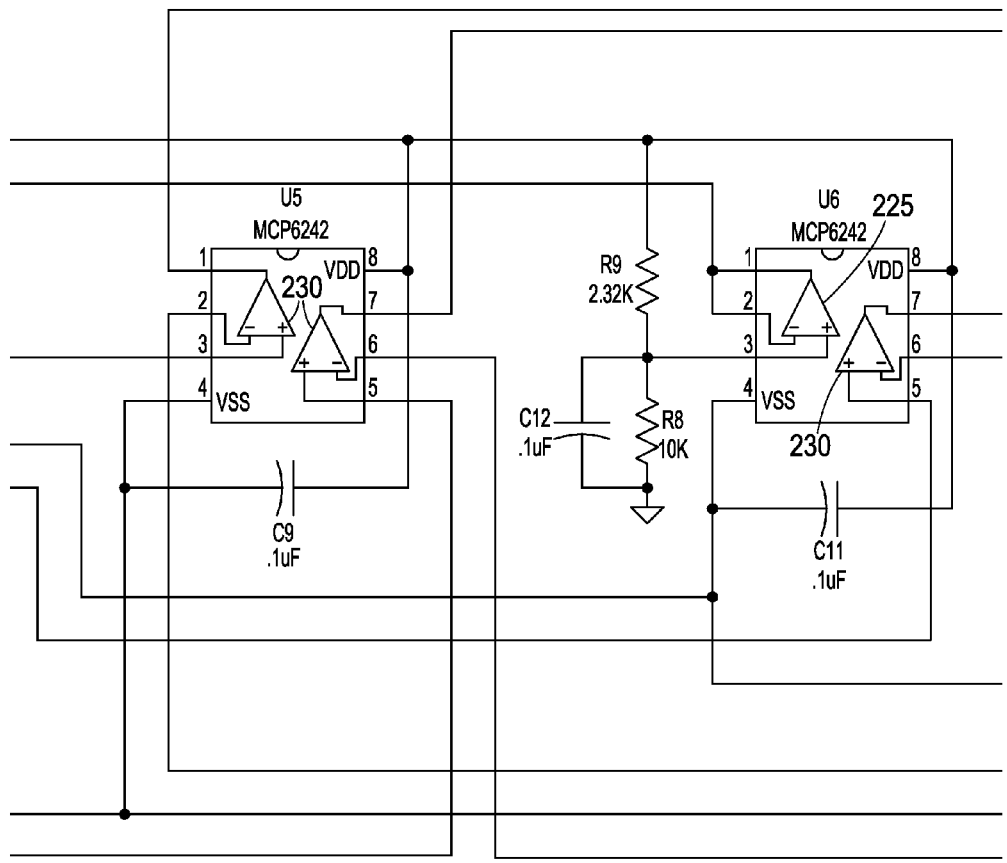

Referring now to FIG. 1A, a system for controlling the brightness of an illumination device, in accordance with a further embodiment of the present invention, is shown. DC power source 105 is coupled to illumination device 110 to provide driving power for illumination device 110. DC power source 105 is further coupled to DC stable reference 155, which is coupled to digital potentiometer 150. Using the stable reference voltage from DC stable reference voltage 155, digital potentiometer can supply a variable, stable, output voltage to voltage converter 115. Voltage converter 115 takes the variable voltage from digital potentiometer 150 and may, in one advantageous embodiment, convert it to a variable current. The brightness level of illumination device 110 is then varied using the power outputted from DC power source 105 and voltage converter 115. Digital potentiometer 150 is further coupled to micro computer 145. Micro computer 145 controls the variable output of digital potentiometer 150, which controls the brightness level of illumination device 110. Micro computer 145 is coupled to a network interface 160 to allow for the remote control of micro computer 145 through network connection 135.

Referring now to FIGS. 2A-2E, a system 200 for controlling the brightness of an array of LED's, in accordance with an embodiment of the present invention, is shown. A user (not shown) can manually adjust dip switches 205. The adjustment of each dip switch 205 changes the desired brightness output of each LED 265, as will be described in detail below. As each dip switch 205 is changed, the system can either immediately adjust the brightness of a single corresponding LED 265, of multiple LED's, or of all LED's currently being controlled. The system can also be designed such that a change in a dip switch 205 requires a time delay, delaying, for a predetermined amount of time, the change in the brightness of an LED 265. Furthermore, a change in a dip switch 205 may be stored in an external memory (not shown) or may be stored on an internal memory, for example, a memory located in microcontroller 210, thereby allowing a user to manually preprogram a set sequence of brightness levels of LED 265. To store the program in microcontroller 210, microcontroller 210 includes a non-volatile memory for permanent storage of the program, even in cases of a power outage. Microcontroller 210 may contain flash memory, EEPROM, or any other type of non-volatile memory.

Microcontroller 210 stores a program of a set sequence of brightness levels for LED 265. Or, as stated above, microcontroller 210 may allow for real time control of LED 265 through dip switches 205. Any adjustment of LED 265 corresponds to a command change from microcontroller 210 to adjust the brightness level of any or all of the LED's being controller. As stated above, the present embodiment is being described with reference to a single LED 265, however, microcontroller 210 is capable of controlling any number of LED's not limited an array of three LED's as shown in FIG. 1.

Microcontroller 210 may be preprogrammed, or programmed in real time, using dip switches 205. Microcontroller 210, however, may be remotely programmed to change the program of LED 265 brightness in either real time, or to load a set program into the memory of microcontroller 210. Transceiver 255 is coupled to microcontroller 210. Transceiver 255 allows for the remote programming or real time control of microcontroller 210. In the schematic of FIG. 1, transceiver 255 is connected to the DMX protocol (RS485) 260. This allows for the remote control of microcontroller 210 through transceiver 255. During the remote control of microcontroller 210, the remote user can install a new program, review and revise an existing program, update the firmware, or troubleshoot microcontroller 210. It should be noted, that while a DMX protocol is shown connected to transceiver 255, any wired or wireless networking protocol may be used to connect to transceiver 255 to remotely control microcontroller 210, and control of microcontroller 210 through transceiver 255 may be over an intranet or over the internet.

Microcontroller 210 is coupled to a plurality of digital potentiometers 215. In the schematic shown, two microchips are displayed, each containing two digital potentiometers 215 on the chip. It should be noted, however, that any number of digital potentiometers 215 may be used depending on the number of LED's used in the system. It should also be noted, that microchips containing a single digital potentiometer 215 may be used instead of a microchip housing multiple digital potentiometers 215. Digital potentiometer 215 provides multiple step voltages in order to vary the current across the LED 265, as will be described below. A command from microcontroller 210 causes the digital potentiometer 215 to adjust to any number of voltage steps. For example, digital potentiometer may allow for 256 discrete voltage steps. However, digital potentiometer 215 may allow for any number of voltage steps greater than or less than 256 steps.

Digital potentiometer 215 is coupled to operational amplifier 230. As shown, there is one operational amplifier 230 for each digital potentiometer 215, however, the system may be designed such that a one-to-one ratio of operational amplifiers 230 to digital potentiometer 215 is not required. An output of each digital potentiometer 215 is connected to one of the inputs on the corresponding operational amplifier 230. Digital potentiometer 215 is further coupled to the negative side of resistor 245. A second operational amplifier 225 is coupled to the digital potentiometer. By connecting the negative side of resistor 245 and operational amplifier 225 to digital potentiometer 215, a comparison is done to cause digital potentiometer to be accurate to plus or minus 1 bit, thereby controlling the error associated with a digital potentiometer. In a typical digital potentiometer 215, there is typically a plus or minus 20% error in the driving of the +VCC side of the digital potentiometer 215. This can make it difficult to control the precise voltage level required by a system. Using the connection scheme above, the error of digital potentiometer 215 can be swamped. The system can then control the 256 discrete voltage levels, regardless of the error rate, thus providing for 256 different brightness levels of LED 265.

As stated above, digital potentiometer 215 is coupled to one of the inputs of operational amplifier 230. The second input of operational amplifier 230 is coupled to the source side of MOSFET 240. A comparison is done by operational amplifier 230 to stabilize the output of operational amplifier 230. The output of operational amplifier 230 is coupled to the gate of MOSFET 240. The voltage output of operational amplifier 230 activates the gate of MOSFET 240 depending on the voltage steps as outputted from digital potentiometer 215.

As can be seen in the schematic of FIGS. 2A-2E. LED 265 comprises one or more diodes 235, a MOSFET 240, and a resistor 245. LED 265 comprises other components, shown in the schematic, not detailed in this description. The diodes 235, the MOSFET 240, and the resistor 245 are all in series with each other. When the gate of MOSFET 240 is activated, using the output voltage of operational amplifier 230, a current flows through all of the components in series. The voltage across resistor 245 is varied based on the voltage step of digital potentiometer 215 through operation amplifier 230, thus changing the current across LED 265. The current change across LED 265 adjusts the brightness of LED 265 to one of the predetermined levels from the voltage steps of digital potentiometer 215. The use of a change in a current across LED 265, instead of a duty cycle of the voltage across LED 265, as in a PWM system, increases the lifespan of LED 265, while decreasing the flicker associated with PWM systems. Finally, voltage regulator 250 is used to drive a constant voltage to LED 265.

Figure 3:
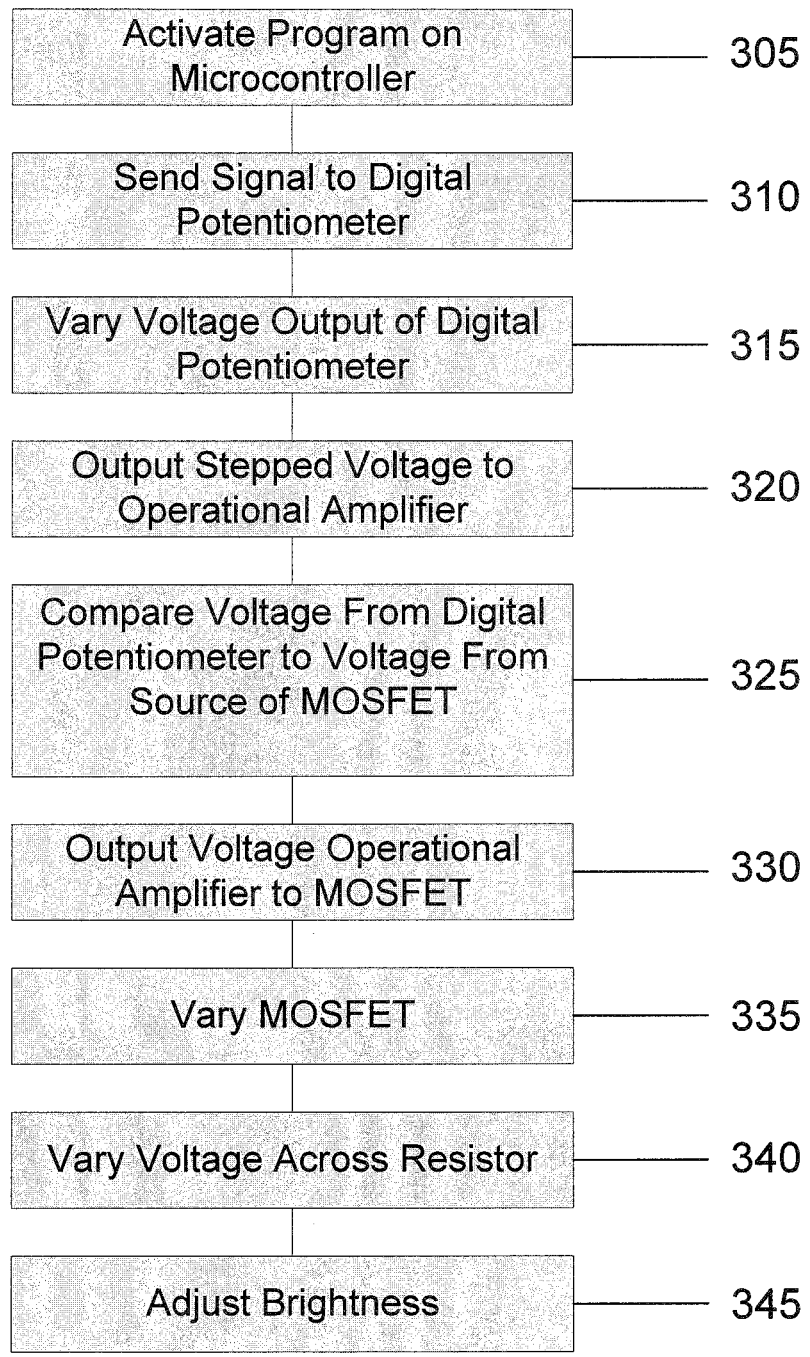
FIG. 3 is a flow diagram illustrating a method for controlling the brightness of an LED according to FIG. 1.

Referring now to FIG. 3, the various operations performed by system 200 are shown. At step 305, a program on microcontroller 210 is activated, controlling a sequence of brightness levels of LED 265. As stated above, the program may be stored in microcontroller 210 or can be controlled in real time. The programming can further be done using dip switches 205 directly attached to microcontroller 210 or the programming can be done remotely using transceiver 255 over a network protocol such as DMX 260. Once the program on microcontroller 210 is activated, a signal is sent to the corresponding digital potentiometer 215, at step 310. Microcontroller 210 sends either a single signal to a single digital potentiometer 215 for one or more LED's 265, or single or multiple signals to multiple digital potentiometers 215 for one or more LED's 265.

At step 315, digital potentiometer 215 varies the voltage to one of 256 voltage steps, or to any number of possible voltage steps depending on the digital potentiometer used. At step 320, the voltage step, as determined by microcontroller 210, is outputted to operational amplifier 230. At step 325, operational amplifier 230 compares the voltage from digital potentiometer 215 to the voltage from the source side of MOSFET 240 to provide a stabilized voltage output. At step 330, the stabilized output voltage from operational amplifier 230 is outputted to the gate of MOSFET 240. At step 335, MOSFET 240, acting like a class A amplifier in the active region, varies the source to the drain of MOSFET 240. During the basic operation of the device shown in FIGS. 2A-2E, digital potentiometer 215 outputs a variable voltage output to be used as an analog control signal of MOSFET 240. MOSFET 240, in conjunction with operational amplifier 230 and resistor 245, creates a variable voltage converter (e.g., in this embodiment, a variable voltage to current converter) that is used to drive LED 265. The current is kept constant by feeding back the voltage dropped on resistor 245 and comparing it to the analog voltage from the output of digital potentiometer 215. The LED current is equal to digital potentiometer 215 reference voltage divided by resistor 245. So, when the digital potentiometer voltage 215 changes operational amplifier 230, MOSFET 240 is driven to a state of either more on or more off until the feedback voltages match. MOSFET 240 is in operational amplifier 230's negative feedback loop, and thus precisely control the current of LED 265.

At step 340, the voltage across resistor 245 is varied, causing a change in the current across LED 265. The change in current across LED 265 causes a change in the brightness of LED 265 depending out the voltage step from digital potentiometer 215, at step 345. The change in current allows for a longer lifespan, and less flickering of LED 265.

It should be noted that, while various methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

The present invention, therefore, provides a system and method of controlling the brightness of an LED through a change in the current across the LED. The embodiment above has been described in reference to a single LED. However, the brightness of an array of LED's may be controlled; the LED's being of any known color including, but not limited to red, green, and blue. The present embodiment was also described as including a single microcontroller, a single digital potentiometer, and a single operational amplifier connected to the LED, however, any number of the above components may be used to control any number of possible LED combinations.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for controlling a brightness level of a Light Emitting Diode comprising:
    a Light Emitting Diode (LED);
    said LED connected in series with a transistor and a resistor;
    a power supply connected to said LED;
    a digital potentiometer;
    said digital potentiometer supplying a variable output voltage to an operational amplifier;
    said operational amplifier having an output connected to said transistor to activate said transistor;
    said operational amplifier receiving a voltage developed across said resistor;
    wherein said activation of said transistor by said operational amplifier varies a current through said LED to control the brightness level of said LED; and
    said digital potentiometer is connected to a negative side of said resistor and to an output of a second operational amplifier to swamp an error of said digital potentiometer.

2. The system of claim 1, wherein said variable output voltage of said digital potentiometer can be varied by at least 256 discrete voltage steps.

3. The system of claim 2, wherein a microcontroller varies said output steps of said digital potentiometer.

4. The system of claim 3, wherein said microcontroller is connected to a transceiver.

5. The system of claim 4, wherein said microcontroller includes an EEPROM which can be programmed by said transceiver.

6. The system of claim 4, wherein said transceiver is connected to a network to allow remote control of said transceiver.

7. The system of claim 6, wherein a remote user can update a program or a firmware installed in said microcontroller.

8. The system of claim 1 wherein a DMX control protocol is used to control said brightness of said LED.

9. The system of claim 1 further comprising a further LED.

10. The system of claim 9 further comprising a further field effect transistor, resistor, operational amplifier and digital potentiometer.

11. The system of claim 1, wherein:
    said power supply comprises a voltage source; and
    said LED is between said transistor and said voltage source.

12. The system of claim 11, wherein said transistor is positioned between said resistor and said LED.

13. The system of claim 12, wherein:
    said operational amplifier has first and second inputs;
    said digital potentiometer is connected to said first input of said operational amplifier;
    said transistor comprises first, second and third terminals;

said first terminal of said transistor is connected to said LED;

said second terminal of said transistor is connected to said output of said operational amplifier;

said third terminal of said transistor is connected to said resistor; and said second input of said operational amplifier is connected to said third terminal of said transistor.

14. The system of claim 13, wherein said transistor comprises a field effect transistor (FET) having a drain, a gate, and a source, and said first, second and third terminals of said transistor comprise said drain, said gate and said source of said FET, respectively; and said first input of said operational amplifier is a non-inverting input and said second input of said operational amplifier is an inverting input.

15. A method of controlling a brightness level of an LED comprising the steps of:

supplying power to an LED;

the LED being in series with a transistor and a resistor;

connecting an output of an operational amplifier to the transistor;

supplying a first voltage from a digital potentiometer to a first input of the operational amplifier;

activating the transistor based on a voltage output from the operational amplifier;

varying a current through the LED when the transistor is activated;

supplying a second voltage developed across the resistor to a second input of the operational amplifier to provide a stabilized output of the operational amplifier; and outputting a voltage from a second operational amplifier and a voltage from a negative side of the resistor to the digital potentiometer to swamp the error of the digital potentiometer;

wherein the varying of the current through the LED changes the brightness level of the LED.

16. The method of claim 15, wherein the first voltage from the digital potentiometer can vary by at least 256 discrete voltage steps.

17. The method of claim 16, wherein a microcontroller varies the voltage steps from the digital potentiometer.

18. The method of claim 17, wherein the microcontroller is connected to a transceiver.

19. The method of claim 18, wherein the transceiver is connected to a network to allow remote control of the transceiver.

20. The method of claim 19, wherein a remote user can update a program or a firmware installed in the microcontroller.

21. The method of claim 15 further comprising controlling a brightness of a further LED.

22. The method of claim 21 further comprising a further field effect transistor, resistor, operational amplifier and digital potentiometer.

23. The method of claim 15, wherein a DMX control protocol is used to control the brightness of the LED.

24. The method of claim 15, wherein said transistor comprises first, second and third terminals, and the power is supplied by a voltage source, the method further comprising the steps of:

connecting the LED to the voltage source and to the first terminal of the transistor;

connecting the output of the operational amplifier to the second terminal of the transistor;

connecting the resistor to the third terminal of the transistor; and connecting the second input of the operational amplifier the third terminal of the transistor.

25. The method of claim 24, wherein the transistor is a field effect transistor (FET) having a drain, a gate and a source, where the first, second, and third terminals of the transistor comprise the drain, gate and source of the FET, respectively, and where the first and second inputs of the operational amplifier comprise non-inverting and inverting inputs of the operational amplifier, respectively.

26. A method of controlling a brightness level of an LED comprising the steps of:

supplying power to an LED;

the LED being in series with a field effect transistor and a resistor;

supplying a voltage from a digital potentiometer to a first operational amplifier;

activating the field effect transistor based on a voltage from the first operational amplifier;

varying a voltage across the resistor when the field effect transistor is activated;

wherein the varying of the voltage across the resistor changes the brightness level of the LED and;

outputting a voltage from a second operational amplifier and a voltage from a negative side of the resistor to the digital potentiometer to swamp the error of the digital potentiometer.

27. The method of claim 26, wherein the voltage from the digital potentiometer can vary by at least 256 discrete voltage steps.

28. The method of claim 27, wherein a microcontroller varies the voltage steps from the digital potentiometer.

29. The method of claim 28, wherein the microcontroller is connected to a transceiver.

30. The method of claim 29, wherein the transceiver is connected to a network to allow remote control of the transceiver.

31. The method of claim 30, wherein a remote user can update a program or a firmware installed in the microcontroller.

32. The method of claim 26 further comprising controlling a brightness of a further LED.

33. The method of claim 32 further comprising a further field effect transistor, resistor, operational amplifier and digital potentiometer.

34. The method of claim 26, wherein a DMX control protocol is used to control the brightness of the LED.

35. The method of claim 26, wherein the operational amplifier compares the first voltage from the digital potentiometer to a voltage supplied from a source of the field effect transistor to provide a stabilized output of the operational amplifier.

36. A system for controlling an output illumination level of a lighting system comprising:

a voltage source;

an illumination device coupled to said voltage source;

a voltage converter coupled to said illumination device;

a load coupled to said voltage converter;

a controller coupled to said voltage source and a switch;

said controller providing a variable voltage to said switch;

said load connected to said voltage converter such that a voltage developed across said load is fed to said voltage converter; and wherein the output illumination level of said illumination device varies according to the variable current passing through said illumination device, wherein said controller is a microcontroller and further comprising a digital potentiometer coupled to said microcontroller.

37. The system according to claim 36, wherein said illumination device is an LED.

38. The system according to claim 36, wherein said load is a resistor.

39. The system according to claim 36, wherein said switch is one of at least a Bipolar transistor, JFET, MOSFET, DEPFET, DGMOSFET, DNAFET, FREDFET, HEMT, IGBT, ISFET, MESFET, MODFET, NOMFET and a OFET.

40. The system according to claim 36 wherein said voltage converter comprises a voltage to current converter.

41. A system for controlling a brightness level of a Light Emitting Diode comprising:
- a Light Emitting Diode (LED);
- said LED connected in series with a field effect transistor (FET) and a resistor;
- a digital potentiometer;
- said digital potentiometer supplying a variable output voltage to an operational amplifier;
- said operational amplifier connected to said FET to activate said FET;
- a power supply connected to said LED;
- wherein said activation of said FET by said operational amplifier varies a voltage across said resistor adjusting the brightness level of said LED; and
- wherein said digital potentiometer is connected to a negative side of said resistor and to an output of a second operational amplifier to swamp an error of said digital potentiometer.

* * * * *